(12) United States Patent
Amtmann et al.

(10) Patent No.: US 7,185,813 B2
(45) Date of Patent: Mar. 6, 2007

(54) PORTABLE DEVICE COMPRISING A COMMUNICATION STATION CONFIGURATION AND A DATA CARRIER CONFIGURATION

(75) Inventors: Franz Amtmann, Graz (AT); Klemens Breitfuss, Voltsberg (AT); Holger Kunkat, Graz (AT); Reinhard Meindl, Graz (AT); Stefan Posch, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/507,947

(22) PCT Filed: Feb. 19, 2003

(86) PCT No.: PCT/IB03/00730

§ 371 (c)(1),
(2), (4) Date: Mar. 21, 2005

(87) PCT Pub. No.: WO03/079281

PCT Pub. Date: Sep. 25, 2003

(65) Prior Publication Data

US 2005/0218230 A1    Oct. 6, 2005

(30) Foreign Application Priority Data

Mar. 18, 2002 (EP) .................. 02100270

(51) Int. Cl.
*G06K 7/08* (2006.01)

(52) U.S. Cl. ...................... 235/451; 235/449

(58) Field of Classification Search ............... 235/451, 235/449; 340/500, 539.11
See application file for complete search history.

(56) References Cited

U.S. PATENT DOCUMENTS 5,841,119 A * 11/1998 Rouyrre et al. ............. 235/380
6,659,343 B2 * 12/2003 Tanaka ....................... 235/380

FOREIGN PATENT DOCUMENTS

EP          1 172 754        1/2001
WO          WO 00 49731      8/2000

* cited by examiner

*Primary Examiner*—Lisa M. Caputo
(74) *Attorney, Agent, or Firm*—Kevin H. Fortin

(57) ABSTRACT

A portable device (1) includes a communication station configuration (10) for contactless communication with at least one external data carrier (13) and a data carrier configuration (11) for contactless communication with at least one external communication station (14), wherein a detection circuit (32) is provided which is designed to detect the presence of an external data carrier (13) and the presence of an external communication station (14) in a communication zone of the internal communication station configuration (10) and the internal data carrier configuration (11) designed for contactless communication, and wherein an activation circuit (33) cooperating with the detection circuit (32) is provided, by means of which activation circuit (33) one of the two configurations (10, 11) can be activated as a function of the detection result (INFO1, INFO2, INFO3) supplied in each case by the detection circuit (32).

20 Claims, 2 Drawing Sheets

PORTABLE DEVICE COMPRISING A COMMUNICATION STATION CONFIGURATION AND A DATA CARRIER CONFIGURATION

The invention relates to a portable device comprising a communication station configuration which is provided and designed for contactless communication with at least one data carrier external to the portable device and in contactless communication connection therewith.

A portable device as described above in the first paragraph is known, for example, from patent document DE 199 17 223 A1. The known portable device is a portable read device by means of which files may be easily located. The known read device comprises a communication station configuration by means of which transponders, i.e. data carriers, fitted to a file to be retrieved or associated with such a file may be located, and characteristic data stored in each transponder may then be read out during performance of a communication process, wherein a sought file may be easily found by means of the stored characteristic data in that display information corresponding to these characteristic data is displayed on a display device of the read device. Although it is possible to effect simple and reliable locating of files with the known portable device, the known portable device offers only this functionality and therefore allows only such location.

It is an object of the invention to improve a portable device with regard to its possible functions, i.e. to provide at least two functionalities and to ensure simple, reliable selection of in each case one functionality.

To achieve the above-mentioned object, features according to the invention are provided for a portable device according to the invention, such that a portable device according to the invention may be characterized in the following way, namely:

A portable device comprising a communication station configuration which is provided and designed for contactless communication with at least one data carrier external to the portable device and in contactless communication connection therewith, and communication with at least one communication station external to the portable device and in contactless read connection therewith, and comprising detection means which are provided and designed to detect at least one external data carrier located in a communication zone suitable for a contactless communication connection and to detect at least one external communication station located in a communication zone suitable for a contactless communication connection, and comprising activation means cooperating with the detection means, which activation means cooperate with the communication station configuration and with the data carrier configuration and by which means one of the two configurations can be activated as a function of the detection result supplied in each case by the detection means.

By providing the features according to the invention, a portable device may be provided of relatively low complexity which offers both the functionality of a communication station and the functionality of a data carrier and with which the functionality desired in each case may be selected simply and automatically and consequently very reliably and may consequently be brought into operation.

In a portable device according to the Invention, detection of an external data carrier and detection of an external communication station may be effected in that the detection means of the portable device according to the invention are so designed that they can detect the presence of a resonant transmission circuit of an external data carrier or the presence of a resonant transmission circuit of an external communication station in a communication zone suitable for contactless communication connection. However, it has proven highly advantageous to provide for the detection of signals transmitted by the external data carrier or the external communication system. In this way, a detection is ensured which is very simple with regard to circuitry and moreover very reliable and unambiguous.

In the case of a portable device according to the invention, it has proven highly advantageous to provide a display on the portable device. This makes it easily possible for data content stored in a data carrier external to the portable device according to the invention to be displayed by means of the display configuration after being read out by means of the communication station configuration, which is in many cases very useful and convenient for a user of the portable device and such an external data carrier.

In the case of a portable device according to the invention, it has proven highly advantageous for the portable device to take the form of a cell phone or a Personal Digital Assistant (PDA). This advantageously ensures that the functionalities of a cell phone or a Personal Digital Assistant are extended by advantageous additional functionalities. Such a cell phone or such a Personal Digital Assistant may be used to display the data content of known card-form data carriers, such as credit cards, health service cards, and cards for other purposes, and also as an electronic ticket and for access control purposes and as an automobile immobilizer.

In the case of a portable device according to the invention, it has proven highly advantageous, however, for the portable device to take the form of a card-form data carrier. This advantageously ensures that a card-form data carrier constructed according to the invention, which is provided with a display configuration, may additionally also be used to enable the data content of a further data carrier brought into the vicinity of the data carrier according to the invention to be read out by means of the communication station configuration of the data carrier according to the invention, and subsequently displayed by means of the display configuration of the data carrier according to the invention. This provides the considerable advantage that a user with a plurality of personal cards requires only a single personal card designed according to the invention with a display configuration and the data contents of all the other cards may be displayed by means of the data carrier according to the invention. It should be mentioned that card-form data carriers with display means are known per se, for example from patent document DE 296 02 834 U 1.

The above mentioned aspects of the invention and further aspects thereof emerge from the examples of embodiment described below and are explained with reference to these examples of embodiment.

The invention will be further described with reference to examples of embodiments shown in the drawings to which, however, the invention is not restricted.

Figure 1:
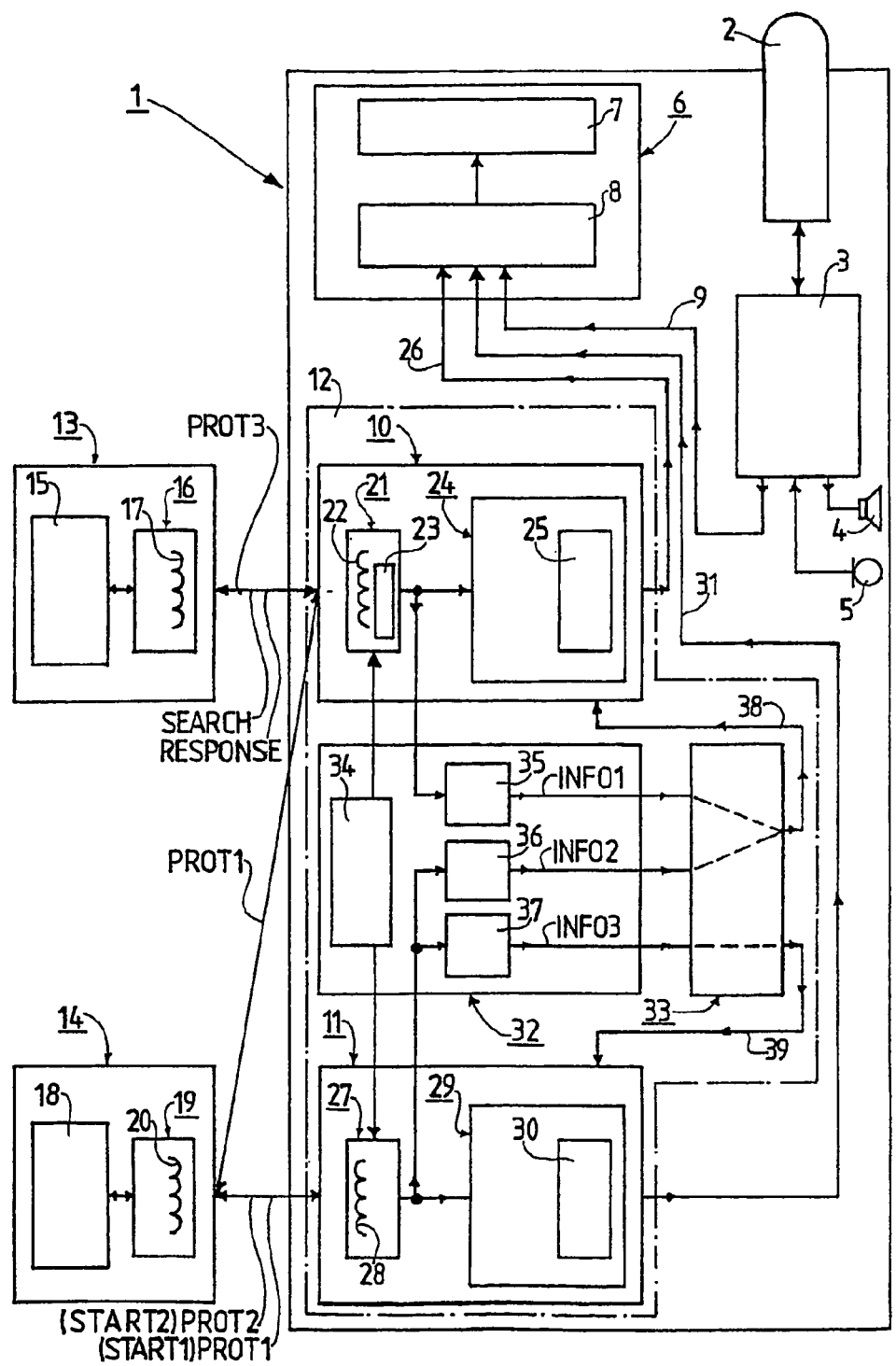
FIG. 1 is a highly schematic representation, in the form of a block diagram, of a portion, essential in the present context, of a portable device according to a first example of embodiment of the invention.

FIG. 1 shows a portable device 1 which in the present case takes the form of a cell phone 1. The cell phone 1 comprises an antenna 2 by means of which telephone signals can be received and sent. Moreover, the cell phone 1 comprises a telephone signal processing circuit 3 which is connected to the antenna 2 and by means of which telephone signals which have been received or are to be sent may be processed. A loudspeaker 4 for reproducing received telephone signals is connected to the telephone signal processing circuit 3. In addition, a microphone 5 is connected to the telephone signal processing circuit 3, by means of which microphone 5 telephone signals to be processed in the telephone signal processing circuit 3 and subsequently to be sent can be generated.

The cell phone 1 further comprises a display configuration 6. The display configuration 6 consists substantially of display means 7 and a driver circuit 8, by means of which data signals to be displayed may be processed and subsequently fed to the display means 7 for display purposes. In the present case, the display means 7 are a so-called LCD display. It goes without saying that any other suitable display device may be provided as the display configuration 6.

The display configuration 6 is connected to the telephone signal processing circuit 3 via a schematically illustrated connection 9. This makes it possible for signals received by the telephone signal processing circuit 3 to be fed after processing thereof in the telephone signal processing circuit 3 to the driver circuit 8, whereupon the data represented by these signals may be displayed by the display means 7.

The cell phone 1 particularly advantageously comprises both a communication station configuration 10 and a data carrier configuration 11, which are both provided on a circuit board 12. The communication station configuration 10 is provided and designed for contactless communication with at least one data carrier 13 external to the cell phone 1 and in contactless communication connection therewith, and in this case also for contactless communication with at least one communication station 14 external to the cell phone 1 and in contactless read connection therewith. The external data carrier 13 comprises an external data carrier circuit 15 in the form of an integrated circuit, which data carrier circuit 15 cooperates with transmission means 16, which transmission means 16 comprise a transmission coil 17. The data carrier configuration 11 is provided and designed for contactless communication with at least one communication station 14 external to the cell phone 1 and in contactless read connection therewith. The external communication station 14 comprises an external communication station circuit 18 and transmission means 19 cooperating with the external communication circuit 18, which transmission means 19 likewise comprise a transmission coil 20.

The internal communication station configuration 10 contained in the cell phone 1 comprises first transmit/receive means 21, which comprise a transmission coil 22. In the present case, the first transmit/receive means 21 additionally also comprise a search signal generation stage 23 by means of which a search signal SEARCH can be generated. Furthermore, the internal communication station configuration 10 comprises an internal communication station circuit 24 which is provided and designed to process signals received or to be sent by means of the first transmit/receive means 21. The internal communication station circuit 24 here takes the form of an integrated circuit and comprises, in addition to a plurality of other components, a first memory 25. In the first memory 25 there are stored, inter alias, data transmitted to the communication station configuration 10 by external data carriers 13 or by external communication stations 14. The internal communication station circuit 24 is connected to the driver circuit 8 of the display configuration 6 via a schematically illustrated connection 26. This allows data or data contents contained in the internal communication station circuit 24 and in particular in the first memory 25 to be supplied to the driver circuit 8 of the display configuration 6 and subsequently to be displayed by the display means 7.

The internal data carrier configuration 11 comprises second transmit/receive means 27 which likewise comprise a transmission coil 28. To the second transmit/receive means 27 there is connected an internal data carrier circuit 29 which is provided and designed to process signals received or to be sent by the second transmit/receive means 27. The internal data carrier circuit 29 comprises, in addition to a plurality of assemblies, a second memory 30, which preferably takes the form of a non-volatile memory or of a fixed programmed memory and in which, inter alias, data or data contents may be stored which have been received from an external communication station 14. The internal data carrier circuit 29 is connected to the driver circuit 8 of the display configuration 6 via a schematically illustrated connection 31, whereby it is possible for data or data contents contained in the internal data carrier circuit 29 and in particular in the second memory 30 thereof to be forwarded to the driver circuit 8 and subsequently displayed by the display means 7. In an alternative embodiment, the connection 31 may also be dispensed with if no display functionality is required or desired for the data carrier configuration 11.

The following should also be noted with regard to the contactless communications or communication modes which are possible for external data carriers 13 and external communication stations 14 in the case of the cell phone 1. An external communication station 14 may communicate with the internal communication station configuration 10 using a first protocol PROT1, wherein according to the first protocol PROT1 a first start signal START1 is provided at the start thereof and, when the first protocol PROT1 is used, data or data signals are transmitted by means of at least a first coding mode and by means of a first modulation mode. An external communication station 14 may communicate with the internal data carrier configuration 11 using a second protocol PROT2, wherein according to the second protocol PROT2 a second start signal START2 is provided at the start thereof and, when the second protocol is used, data or data signals for transmission are modulated in accordance with at least a second coding mode and in accordance with a second modulation mode. In the event of communication between an external data carrier 13 and the internal communication station configuration 10, communication takes place using a third protocol PROT3, wherein, when the third protocol is used, data or data signals for transmission are transmitted in accordance with at least a third coding mode and in accordance with a third modulation mode.

The cell phone 1 advantageously comprises detection means 32, provided and designed to detect at least one external data carrier 13 located in a communication zone suitable for a contactless communication connection and to detect at least one external communication station 14 located in a communication zone suitable for a contactless communication connection. The design of the detection means 32 is examined in more detail below.

The cell phone 1 advantageously further comprises activation means 33 cooperating with the detection means 32, which activation means 33 cooperate both with the internal communication station configuration 10 and with the internal data carrier configuration 11, and by which means 33 one of the two configurations 10 and 11 can be activated as a function of the detection result supplied in each case by the detection means 32, such that, depending on the detection result, either the internal communication station configuration 10 or the internal data carrier configuration 11 is activated and consequently set in operation for full communication with at least one external data carrier 13 or with at least one external communication station 14.

The detection means 32 and the activation means 33 are provided, together with the internal communication station configuration 10 and the internal data carrier configuration 11, on the circuit board 12 of the cell phone 1.

The detection means 32 comprise control means 34 which can act in a controlling manner via respective control connections 35 and 36 on the first transmit/receive means 21 and the second transmit/receive means 27, thereby allowing the first transmit/receive means 21 and the second transmit/receive means 27 to be activated without the internal communication station configuration 10 and the internal data carrier configuration 11 being or having to be activated already.

The detection means 32 additionally comprise a first detection stage 35 which is connected to the first transmit/receive means 21 and by means of which the occurrence of a response signal RESPONSE transmitted to the internal communication station configuration 10 in response to a search signal SEARCH by at least one external data carrier 13 can be detected. If such a response signal RESPONSE is detected by the first detection stage 35, the first detection stage 35 outputs a first item of control information INFO1.

The detection means 32 additionally comprise a second detection stage 36 and a third detection stage 37, which are both connected to the second transmit/receive means 27. The second detection stage 36 is provided and designed to detect a first start signal START1 arising at the start of the first protocol PROT1 from an external communication station 14 upon use of the first protocol PROT1. The third detection stage 37 is provided and designed to detect a second start signal START2 arising at the start of the second protocol PROT2 in the event of communication with an external communication station 14 when the second protocol PROT2 is used. If the second detection stage 36 detects a first start signal START1, the second detection stage 36 outputs a second item of control information INFO2. If the third detection stage 37 detects a second start signal START2, the third detection stage 37 outputs a third item of control information INFO3.

To summarize, it should thus be noted with regard to the detection means 32 that the detection means 32 detect simply by means of signals, whether at least one external data carrier 13 or at least one external communication station 14 is located in a communication zone suitable for a contactless communication connection namely either by means of a response signal RESPONSE or by means of a first start signal START1 or by means of a second start signal START2, which are all transmitted in a contactless manner to the cell phone 1 and in particular to the first transmit/receive means 21 or to the second transmit/receive means 27 and subsequently fed to the detection stages 35, 36, or 37 connected to the first transmit/receive means 21 or the second transmit/receive means 27. The control information INFO1, INFO2, and INFO3 generatable or generated by means of the three detection stages 35, 36, and 37 of the detection means 32 can be supplied to the activation means 33 and are processed logically in the activation means 33 such that the activation means 33 ensure activation of the internal communication station configuration 10 via a control connection 38 if the first item of control information INFO1 and the second item of control information INFO2 occur, and such that the activation means 33 ensure activation of the internal data carrier configuration 11 via a control connection 39 in the event of the occurrence of the third item of control information INFO3.

The mode of operation of the cell phone 1 with regard to the internal communication configuration 10 and the internal data carrier configuration 11 is explained briefly below.

In the cell phone 1, the control means 34 ensure a "polling" operation of the first transmit/receive means 21 and the second transmit/receive means 27. This means that the two transmit/receive means 21 and 27 are activated by the control means 34 in succession in each case for a given period of time, for example for 100 msec in each case.

If the first transmit/receive means 21 are activated, this results in the search signal generating stage 23 transmitting a search signal SEARCH. If at least one external data carrier 13 is located in a communication zone suitable for a contactless communication connection, this results in said at least one external data carrier 13 receiving the search signal SEARCH and consequently generating a response signal RESPONSE. The response signal RESPONSE is received by the still activated first transmit/receive means 21 and subsequently fed to the first detection stage 35 of the detection means 32. The response signal RESPONSE is detected by the first detection stage 35, which results in the generation of the first item of control information INFO1 and outputting thereof to the activation means 33. This in turn has the consequence that the activation means 33 activate, via the control connection 38, the entire internal communication station configuration 10, such that problem-free, full communication is subsequently enabled between the internal communication station configuration 10 and all the external data carriers 13 located in a communication zone suitable for a contactless communication connection.

If the control means 34 ensure activation of the second transmit/receive means 27, this has the consequence that signals output either according to the first protocol PROT1 or according to the second protocol PROT2 are received by the second transmit/receive means 27 from at least one external communication station 14 located in a communication zone suitable for a contactless communication connection—which communication station 14 outputs of its own volition and without being asked either signals according to the first protocol PROT1 or signals according to the second protocol PROT2—and consequently either the first start signal START1 or the second start signal START2 is received. The signals received in each case are forwarded by the second transmit/receive means 27 to the two detection stages 36 and 37 for the two start signals START1 and START2. Depending on which start signal START1 or START2 has been received, the received start signal is detected by the relevant detection stage 36 or 37. If a first start signal START1 has been received, this is detected by the second detection stage 36, which results in the second detection stage 36 outputting the second item of control information INFO2, which in turn results in the second item of control information INFO2 being processed by the activation means 33 and results in the activation means 33 activating the internal communication station configuration 10 via the control connection 38, such that communication operation is subsequently enabled between at least one external communication station 14 and the internal communication station configuration 10 using the first protocol PROT1. If, on the other hand, a second start signal START2 has been received, this start signal START2 is detected by the third detection stage 37, which results in the third detection stage 37 generating the third item of control information INFO3 and outputting it to the activation means 33. The third item of control information INFO3 is processed by the activation means 33, which results in the activation means 33 ensuring activation of the internal data carrier configuration 11 via the control connection 39, such that communication is subsequently enabled according to the second protocol PROT2 between at least one external communication station 14 and the internal data carrier configuration 11.

By enabling communication between an external communication station 14 and the internal data carrier configuration 11, it is possible, for example, to read out authorization data from the second memory 30 for use of a means of public transport and to transmit it to the external communication station 14, such that in this case the cell phone fulfills the function of an electronic ticket. It goes without saying that a plurality of other functionalities is similarly possible due to communication between an external communication station 14 and the internal data carrier configuration 11, for example access authorization to a medical database may be provided for the owner of the cell phone 1 by means of the internal data carrier configuration 11.

By enabling communication between an external data carrier 13 and the internal communication station configuration 10, it is possible, for example, to read out data content stored in an external data carrier 13 by means of the internal communication station configuration 10 and to store it intermediately in the first memory 25 and subsequently to display it on the display means 7 of the display configuration 6. This provides the substantial advantage to a user of the cell phone 1, who is also a user of a plurality of external data carriers 13, for example credit cards, insurance cards, and similar data carriers, of being able to display and consequently examine the respective current data contents of his/her external data carriers 13 simply through the display means 7 of the cell phone 1.

Figure 2:
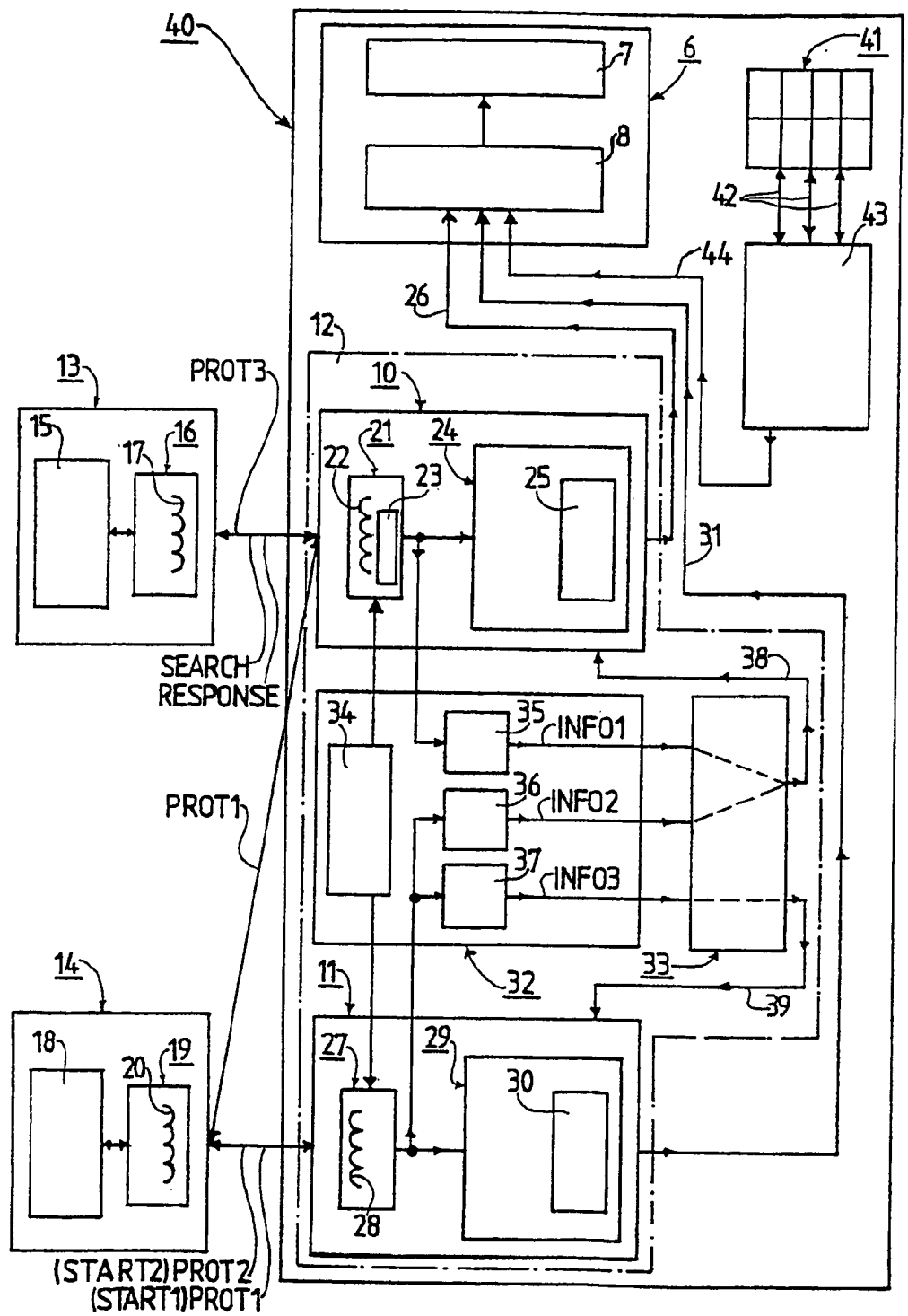
FIG. 2 shows, analogously to FIG. 1, a portable device according to a second example of embodiment of the invention.

FIG. 2 shows a further portable device 40. The portable device 40 is a credit card 40. The credit card 40 comprises for the most part circuitry which is virtually identical to that of the portable device 1 described above with reference to FIG. 1, i.e. the cell phone 1. However, the difference with the cell phone 1 is that the credit card 40 does not have an antenna 2 or a telephone signal processing circuit 3 or a loudspeaker 4 or a microphone 5, but rather the credit card 40 comprises a contact field 41 according to the known international standard, which is connected to a data signal processing circuit 43 via connection lines 42. The data processing circuit 43 is connected to the driver circuit 8 of the display configuration 6 via a schematically illustrated connection 44. With the credit card 40, at least substantially the same advantages may be achieved as have already been described above with reference to the cell phone 1.

If an external communication station 14 is intended to communicate only with the internal data carrier configuration 11 and not also with the internal communication station configuration 10, and consequently no use of the first protocol PROT1 is provided and consequently also no first start signal START1 occurs in modified embodiments of the portable devices 1 and 40 according to FIGS. 1 and 2, no second detection stage 36 is provided but rather only the first detection stage 35 and the third detection stage 37, which two detection stages 35 and 37 in this case simultaneously form or may form the activation means 33, wherein activation of the communication station configuration 10 or the data carrier configuration 11 may be performed by means of the control information INFO1 and INFO3. In more general terms, this means that components of the detection means 32 may simultaneously form the activation means 33.

In the two above-described variant embodiments of a portable device 1 or 40, the detection means 32 and the activation means 33 are provided on the same circuit board 12 as the internal communication station configuration 10 and the internal data carrier configuration 11, but as separate circuit units. This does not absolutely have to be the case, because the detection means 32 and also the activation means 33 may be divided between the internal communication station configuration 10 and the internal data carrier configuration 11, or because the detection means 32 and the activation means 33 may be components of either only the internal communication station configuration 10 or of only the internal data carrier configuration 11.

In the two above-described variant embodiments of a portable device 1 or 40, mutually separate transmit/receive means 21 and 27 are provided for the internal communication station configuration 10 and the internal data carrier configuration 11. This does not absolutely have to be the case, since two transmit/receive means 21 and 27 may alternatively be formed by a common transmit/receive circuit configuration.

It should additionally be mentioned that, instead of transmission coils 17, 20, 22, and 28, which cooperate in the manner of transformers, i.e. inductively, dipoles may be used as antennas if the contactless data transmission is performed in high frequency ranges.

In the two above-described variant embodiments of a portable device 1 or 40, provision is made for external communication stations 14 to be able to communicate in a contactless manner both with the internal data carrier configuration 11 and with the internal communication station configuration 10. This does not absolutely have to be the case, since external communication stations 14 may communicate with the internal data carrier configuration 11 only.

In the two above-described variant embodiments of a portable device 1 or 40, the first transmit/receive means 21 of the internal communication station configuration 10 is designed to transmit a controlling search signal SEARCH. This does not absolutely have to be the case, since provision may also be made for the first transmit/receive means 21 to transmit simply a sinusoidal signal or a square-wave signal as so-called search signal, which serves to transmit energy and which is used after reception in an external data carrier 13 to supply energy to this external data carrier 13, whereupon the external data carrier 13 automatically sends a response signal RESPONSE to the internal communication station configuration 10 once a sufficiently high supply voltage has been built up.

A cell phone 1 and a credit card 40 were described above as portable devices. However, the measures according to the invention may also be applied highly advantageously to other portable devices, for example a so-called "Personal Digital Assistant" (PDA) or a laptop computer or a portable dictating device or an electrical dental care configuration or kitchen scales and many other devices.

The invention claimed is:

1. A portable device, comprising:
    a transceiver system that is configured to selectively provide:
        a communication station configuration that is configured to provide contactless communication with at least one data carrier, and
        a data carrier configuration that is configured to provide contactless communication with at least one communication station, and
    a detector that is configured to detect at least one external data carrier located in a communication zone suitable for a contactless communication connection and to detect at least one external communication station located in a communication zone suitable for a contactless communication connection, and a configuration activator, operably coupled to the detector, that is configured to selectively enable the communication station configuration and the data carrier configuration of the transceiver system, based on a detection result supplied in each case by the detector.

2. A portable device as claimed in claim 1, wherein the detector is configured to detect the at least one external data carrier based on signals generated by the at least one external data carrier, and to detect at least one external communication station based on signals generated by the at least one external communication station.

3. A portable device as claimed in claim 1, including a display that is configured to display data from the at least one data carder when the device is in a communication station configuration.

4. A portable device as claimed in claim 1, wherein the portable device takes the form of a cell phone.

5. A portable device as claimed in claim 1, wherein the portable device takes the form of a Personal Digital Assistant (PDA).

6. A portable device as claimed in claim 1, wherein the portable device is designed as a card-form data carrier.

7. A portable device for use in an environment wherein communication stations effect transfer of information to and from data carriers, comprising:

a communication system that can be configured in at least two configurations: a data carrier configuration and a communication station configuration, and a controller that is configured to independently control the configuration of the communication system, such that:

when the portable device is in communication with an external data carrier device, the communication system is configured in the communication station configuration, and when the portable device is in communication with an external communication station, the communication system is configured in the data carrier configuration.

8. The device of claim 7, wherein the communication system includes:

a first transceiver that is configured to operate in the communication station configuration, and a second transceiver that is configured to operate in the data carrier configuration.

9. The device of claim 8, including a memory that is operably coupled to the first and second transceivers, to facilitate a buffered transfer of information between the external data carrier and the external communication station.

10. The device of claim 8, wherein the first transceiver is configured to transmit a search signal to facilitate detection of the external data carrier via a response to the search signal from the external data carrier.

11. The device of claim 10, wherein the controller is configured to periodically poll the first transceiver, and thereby trigger transmission of the search signal.

12. The device of claim 8, wherein the second transceiver is configured to receive signals from the external communication station, and the controller is configured to periodically enable the second transceiver to receive the signals.

13. The device of claim 7, including a memory that is operably coupled to the communication system, to facilitate a buffered transfer of information between the external data carrier and the external communication station.

14. The device of claim 7, wherein the controller is configured to alternately configure the communication system in the communication station configuration and in the data carrier configuration.

15. The device of claim 7, further including a cellular telephone transceiver.

16. The device of claim 7, further including a display that is configured to display information received by the communication system.

17. The device of claim 16, further including a processing system that is configured to provide Personal Data Assistant (PDA) capabilities to the device.

18. The device of claim 7, wherein the device is structured in a card form.

19. A portable device for use in an environment wherein communication stations effect transfer of information to and from data carriers, comprising:

a communication system that can be configured in at least two configurations: a data carrier configuration and a communication station configuration, and a controller that is configured to control the configuration of the communication system, such that:

when the portable device is in communication with an external data carrier device, the communication system is configured in the communication station configuration, and when the portable device is in communication with an external communication station, the communication system is configured in the data carrier configuration wherein the communication system is configured to transmit a search signal when in the communication station configuration, to facilitate detection of the external data carrier via a response to the search signal from the external data carrier.

20. The device of claim 19, wherein the controller is configured to alternately configure the communication system in the communication station configuration and in the data carrier configuration.

* * * * *